(12) United States Patent  (10) Patent No.: US 8,150,828 B2
Prabhu  (45) Date of Patent: Apr. 3, 2012

(54) COMMUNITY DRIVEN SEARCH USING MACROS

(75) Inventor: Raghavendra V. Prabhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 11/548,074

(22) Filed: Oct. 10, 2006

(65) Prior Publication Data

US 2008/0086443 A1   Apr. 10, 2008

(51) Int. Cl.
 *G06F 7/00* (2006.01)
(52) U.S. Cl. .................... 707/706; 707/766
(58) Field of Classification Search .............. 707/1, 3, 707/4, 706, 766
See application file for complete search history.

(56) References Cited

U.S. PATENT DOCUMENTS

| 6,141,659 A * | 10/2000 | Barker et al. ............... 707/102 |
| 6,449,636 B1 * | 9/2002 | Kredo et al. ................ 709/206 |
| 2005/0010601 A1 * | 1/2005 | Ciaramitaro et al. ...... 707/104.1 |
| 2006/0259690 A1 * | 11/2006 | Vittal et al. .................... 711/118 |
| 2008/0033917 A1 * | 2/2008 | Jones et al. ....................... 707/3 |

* cited by examiner

*Primary Examiner* — Amy Ng
(74) *Attorney, Agent, or Firm* — Shook Hardy & Bacon LLP

(57) ABSTRACT

A community custom search or community search macro is created whereby users access a custom search or search macro from their computing devices. The users can execute the custom search or search macro to return search results. The users can edit the custom search or search macro to modify its contents even though another may be the author or owner of the custom search or search macro. The users can access the modified custom search or modified search macro, or access a prior version of the modified custom search or modified search macro. The custom search or search macro resides on one or more computing devices accessible by the user through the Internet.

20 Claims, 3 Drawing Sheets

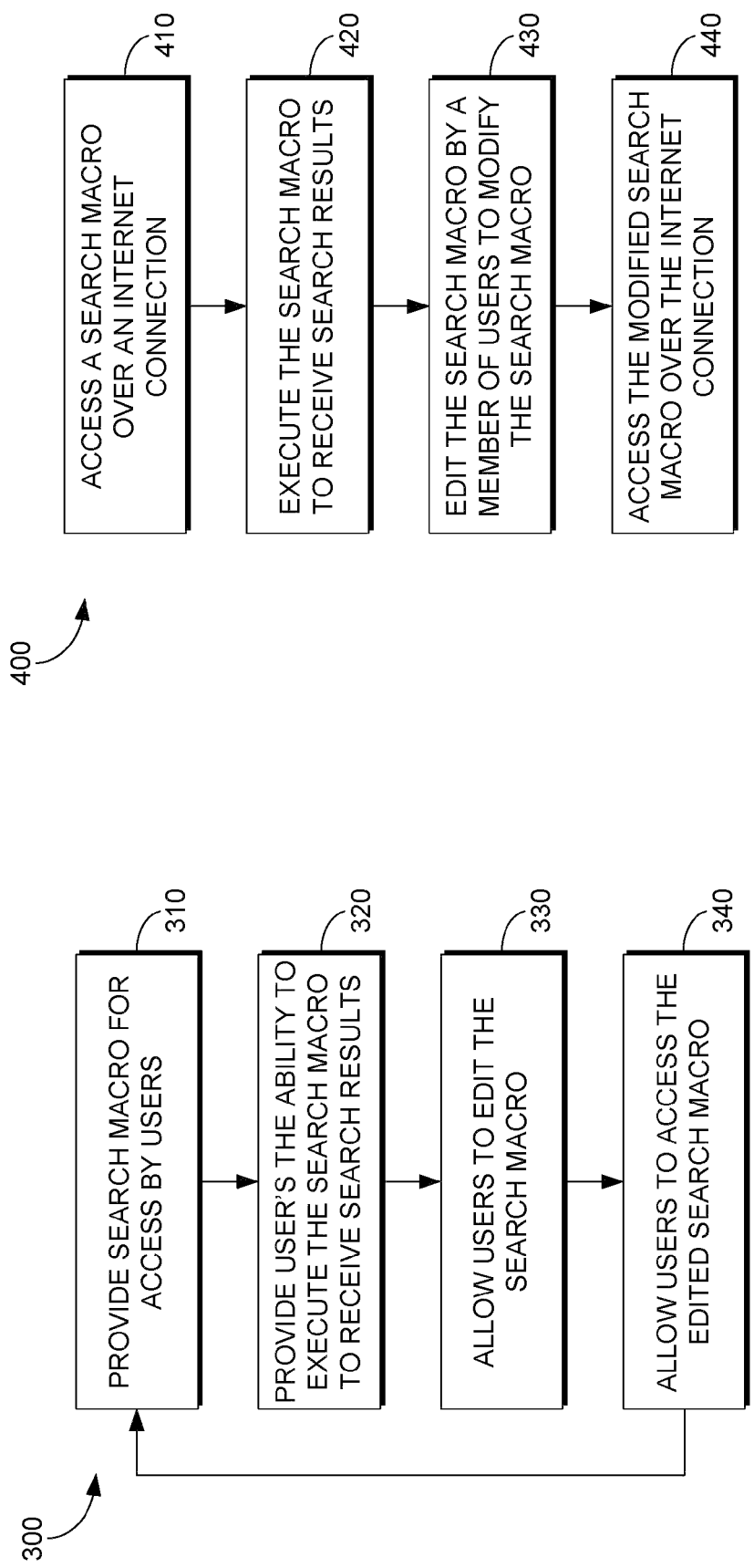

COMMUNITY DRIVEN SEARCH USING MACROS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

One of the reasons WIKIPEDIA is a great resource on the Internet is that it harnesses the collective intelligence of a community. A model that is community-driven has several advantages. Its constituents have different perspectives and backgrounds. It involves people with expertise in different fields. It can be self-policing of its activities. It is easy to scale out. For example, a model of success of community-driven activities may be observed with forums/newsgroups, which have proven to be a resource to get information.

Likewise, while algorithmic search relevance continues to improve, providing a search engine with the context necessary to better target the search can improve the relevance of the results. A search macro can provide this context, specifying a set of modifiers that help narrow the scope of the search. For example, a physician might create a search macro called "andy.health" that restricts a search to a set of high quality medical sites. This search macro is likely to give more relevant results for medical information than a full Internet search.

The approach of a user creating a search macro and sharing it with others for their use is powerful. However, the approach has some shortcomings. First, only the user who owns the search macro can edit it. If another user has a good idea to extend the macro, that user cannot modify the macro without the involvement of the owner. Secondly, if the owner does not have the time to update the search macro regularly, the search macro may become obsolete. New and better websites may become available which the search macro can miss when executed. Thirdly, the search macro incorporates personal biases and preferences of the author. Fourthly, it is not easy to determine which search macro is authoritative and the best for a given category.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, a media, system, method for creating a community search macro. The various solutions are summarized below.

In an aspect, a community search macro leverages the collective knowledge of a community of users in improving a targeted web search. The community search macro is created whereby a set of users access a search macro from their computing devices. The users can execute the search macro to return a set of search results. The users can edit the search macro to modify its contents. The users can access the modified search macro or access a prior version of the modified search macro. The search macro resides on one or more computing devices for accessibility by the users.

BRIEF DESCRIPTION OF THE SEVERAL VIEWS OF THE DRAWINGS

The present invention is described in detail below with reference to the attached drawing figures, which are incorporated herein by reference, and wherein:

FIG. 3 is a flowchart of an exemplary process for creating a search macro when implementing an embodiment of the present invention; and FIG. 4 is a flowchart of an exemplary process for operating a search macro when implementing an embodiment of the present invention.

DETAILED DESCRIPTION

The present invention will be better understood from the detailed description provided below and from the accompanying drawings of various embodiments of the invention, which describe, for example, a media, system, and method for creating and operating a community search macro. The detailed description and drawings, however, should not be read to limit the invention to the specific embodiments. Rather, these specifics are provided for explanatory purposes that help the invention to be better understood.

Exemplary Operating Environment

Figure 1:
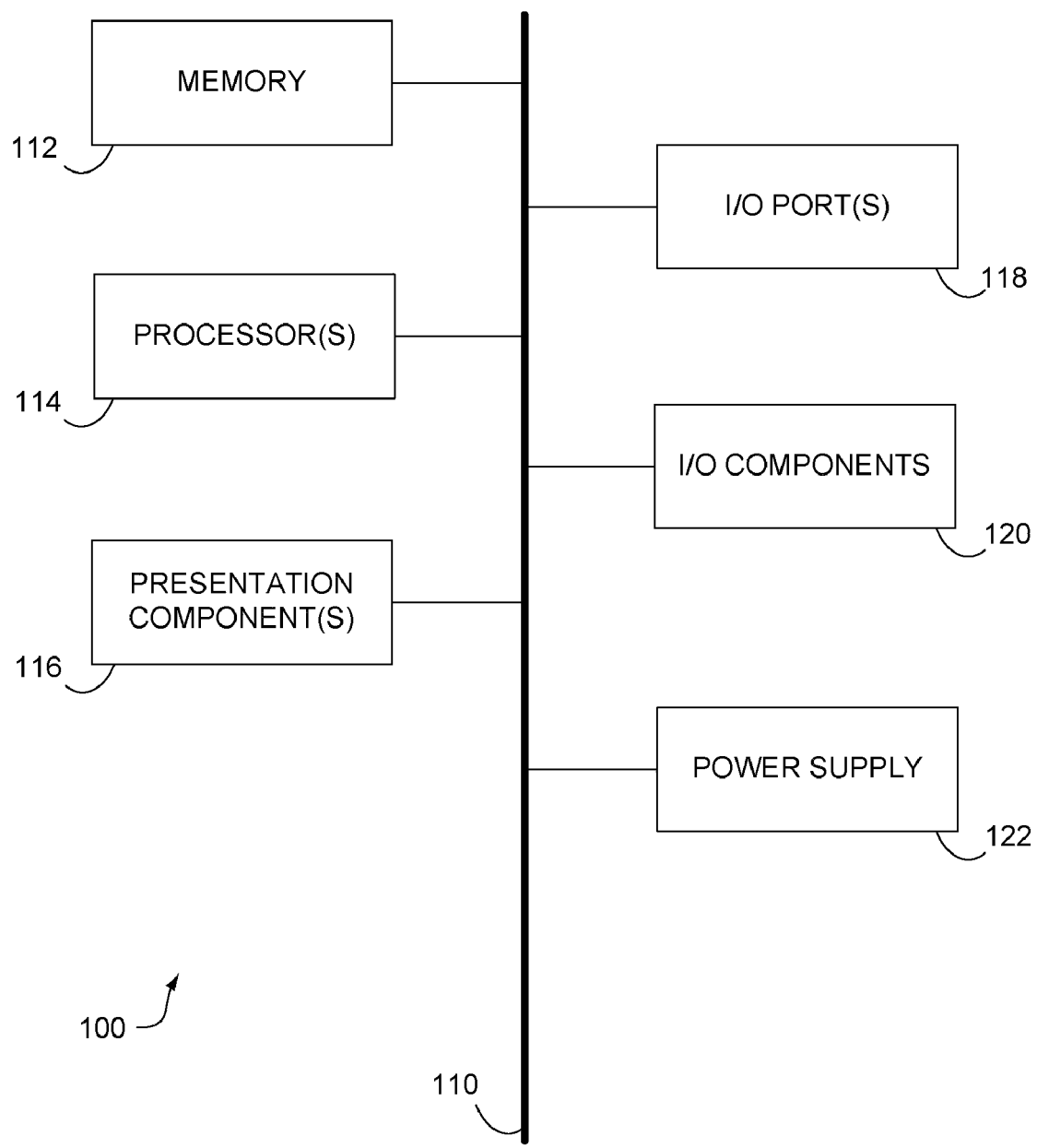
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced. Although the present invention can be employed in connection with a computing-network environment, it should not be construed as limited to the exemplary applications provided here for illustrative purposes.

Community Driven Search

A solution is needed that allows a community of users to create a custom search. The custom search may be in the form of a search macro. The search macro should allow the users to edit the search macro, update the search macro, incorporate input from a large base of users, and lead to authoritativeness in a category. Throughout this specification, wherever the term search macro is used, the activity pertains and includes the term "custom search." The custom search should allow the users to perform the same actions as the search macro with the exception that the user will perform the actions without a macro.

In the context of this specification, a macro includes a set of inputs that may be executed automatically. The macro can incorporate keyboard strokes, commands, instructions, or other computer software. More specifically, a search macro can include a customized set of search engine rules. Macros are well known in the arts and usually include programming macros, keyboard macros, and application macros.

The shortcomings of today's search macros can be addressed in an embodiment of the present invention by introducing a global namespace for macros. In the namespace, editing is not restricted to one individual. Rather, the community of users can contribute to a development of the search macros and can continuously improve it. In an embodiment of the present invention, a history of edits can be preserved so that a user may revert back to a previous version of the search macro. In addition, the embodiment may provide a more authoritative search macro by being community-accessible as opposed to being available to a single author.

Figure 2:
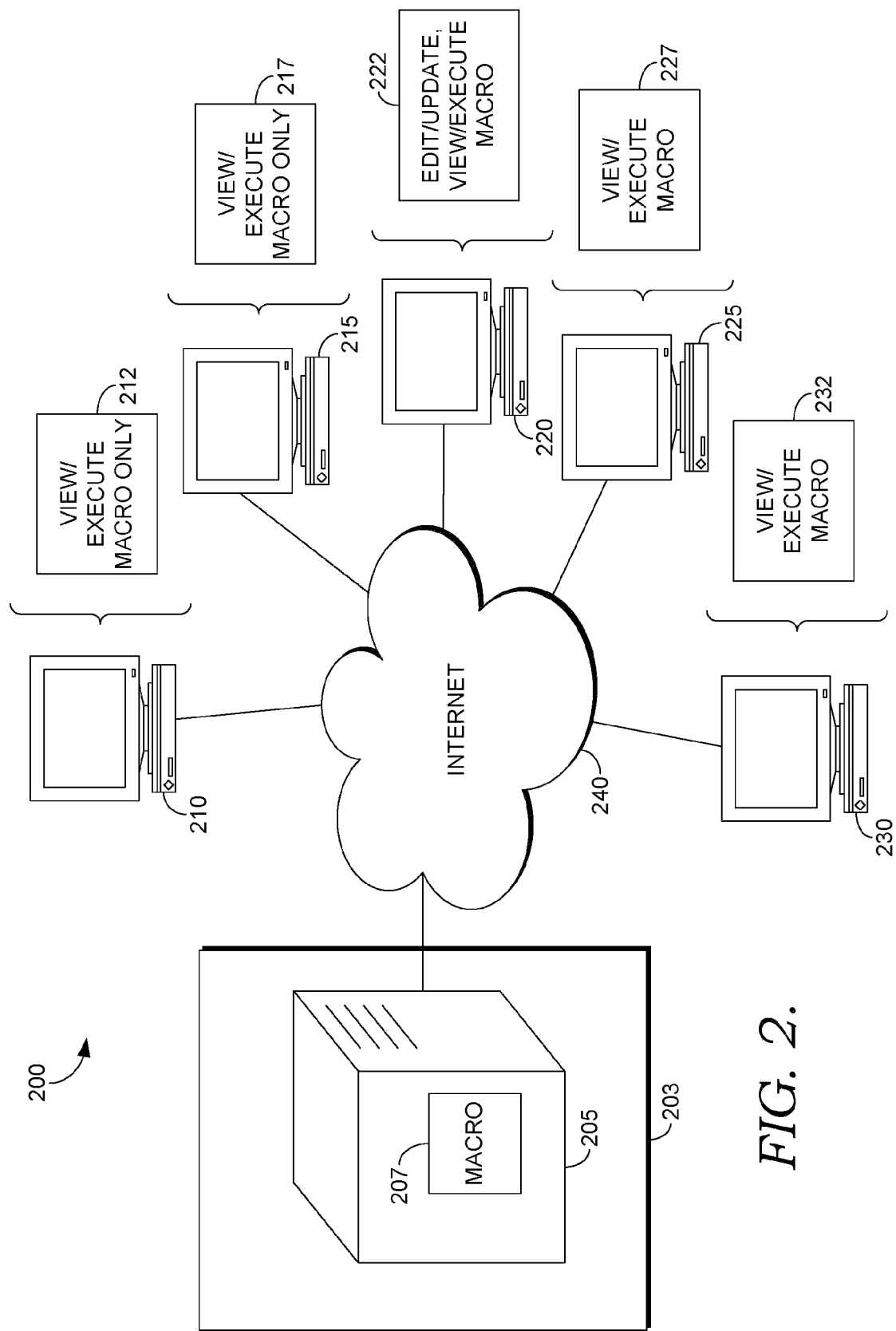
FIG. 2 is a block diagram of an exemplary operating environment for accessing, executing, and editing a search macro when practicing an embodiment of the present invention.

In FIG. 2, an exemplary operating environment 200 is shown with an exemplary online service 203 with a server 205. Server 205 holds a search macro 207 that can be viewed and accessed by a community of users that have access to the Internet. Users 210-230 may access search macro 207 through the Internet 240. Users 210-230 represent the community of users that may view or execute the search macro to obtain search results. Although not discussed here, the types of search results received by the users depend on the contents of the search macro. Some of the users may alter the contents of the search macro as shall be described below to improve the results that the search macro provides when executed.

In FIG. 2, users 210 and 215 can view and execute search macro 207 as shown respectively by views 212 and 217. In an implementation of an embodiment of the present invention, users 210 and 215 are not members or subscribers to online service 203. Therefore, their access to search macro 207 is limited. However, other embodiments of the present invention may alter this setup to allow a broader or more restrictive access to search macro 207.

Users 220-230 represent members or subscribers to online service 203 with viewing, executing, and editing capabilities to search macro 207. In the embodiment, user 220 is shown editing search macro 207 in view 222. Users 225 and 230 can also view and execute search macro 207 as shown in views 227 and 232 but cannot edit search macro while user 220 is editing the search macro. The embodiment restricts editing of search macro 207 to one user at a time. However, another embodiment may allow multiple edits of the search macro and may incorporate computer software or algorithms that keep track of the edits.

In the embodiment of the present invention, once search macro 207 has been modified by one of the members or subscribers, the modified version is stored in server 205. The embodiment can update search macro 207 and preserve a history of edits in case one of the users prefers to revert back to a previous version of search macro 207. Furthermore, all of the users may view the modified search macro 207 once it has been edited and updated. Depending on the embodiment that is implemented, users may view the modified version automatically, may receive a notification that the search macro has been modified and given a choice to view the modified version, or may view the modified search macro through a screen refresh at the user's computing device.

Turning now to FIG. 3, a process for creating a search macro is shown in a method 300. In a step 310, a computing device may be part of a system that provides a search macro for access by users. The users may access the search macro over an Internet connection such as the Internet 240. In a step 320, the system provides the users an ability to execute the search macro, like search macro 207, to receive search results. The users may access the search macro at a server, like server 205, to execute it to obtain search results.

In a step 320, the system may allow users to edit the search macro. Depending on an implementation of an embodiment of the present invention as shown in FIG. 2, the ability to edit the search macro can be restricted to a subset of users like a group of members or subscribers. After the search macro has been edited, users may access the edited or modified search macro as shown in a step 340. Step 340 provides a continuity to continue method 300 by beginning again with step 310.

Although not shown, users may access a prior version of the search macro as described in FIG. 2. The reason for selecting a prior version may vary. For example, the edited content of the search macro may deteriorate the search results when compared to the search results of a prior version. This can happen if a user inputs bad contents in the macro which causes the search macro to provide broader results deviating from the search category. The ability to select prior versions provides users with a mechanism to police or monitor the search macro. In an aspect, the search macro is improved by having the community of users keep it updated. However, the users can also modify the search macro to reduce or keep out incorrect updates.

In FIG. 4, a process for operating a search macros is provided in a method 400. In a step 410, a user may access a search macro 207 over an Internet connection. Search macro 207 resides on server 205 and may be part of online service 203. In a step 420, the user may execute search macro 207 to receive search results. The search results may be tailored to a particular search category for which search macro 207 represents. In a step 430, the user may edit search macro 207 to modify the search macro to influence the search results when the search macro is executed. It is an expectation that if more users access and modify the search macro, then the search macro should improve over time. The users bring diverse experiences that can improve the search macro which will influence and improve the search results. Now, in a step 440, the users can access the modified search macro through the Internet 240. Step 440 illustrates that once the search macro is updated, the other users can access the modified search macro.

It should be noted that in FIGS. 3 and 4, the user that accesses the search macro is not necessarily the owner or author of the search macro. The user can be anyone that has a desire to receive search results for a given category. Also, not all users can edit the search macro. This editing ability can change depending on the implementation of the embodiment of the present invention. Again, the user that edits the search macro is not necessarily the owner or author.

A scenario may described illustrating an implementation of an embodiment of the present invention as discussed in FIGS. 2-4. When a user clicks "create macros" from an online service, the user will need to sign into the online service like LIVE SEARCH from the Microsoft Corporation of Redmond Wash. Once the user is signed in, the user can create a namespace if one has not been previously created. A namespace is an abstract container, like a directory, that provides context for items. The namespace will be associated with the user's identification. For example, in LIVE SEARCH, the namespace can be associated with the user's PASSPORT from the Microsoft Corporation of Redmond, Wash. PASSPORT is a service that contains the user's identification. Through LIVE SEARCH, the user's identification and namespace are associated together. The user can create various search macros in the namespace. The user can also decide which search macros to share publicly so that other users can view and access the macro.

In addition to the user's actions above, a different scenario can begin in the following manner. A community of search macros can be created by a search macros team and placed on a web site. The community of search macros can be based on popular categories and user feedback. Once the search macros are created, all the users may access them. For those subset of users that are signed into the online service, they may also be able to edit the search macros published by the search macros team. In addition, they may also be able to edit the search macros created and shared by the user in the scenario above.

As shown in the scenarios above, search macros can be created by a user or by a third-party service. The ability to edit the search macro can be restricted to a subset of users based on a variety of criteria.

The prior discussion is for illustrative purposes to convey exemplary embodiments. The steps discussed in FIGS. 3 and 4 may be executed without regards to order. Some steps may be omitted and some steps may be executed at a different time than shown. For example, step 330 may be executed before step 320, and step 430 may be executed before step 420. The point here is to convey that the figures are merely exemplary for the embodiments of the present invention and that other embodiments may be implemented. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. One or more computer-readable storage media having computer-executable instructions embodied thereon for performing a method of creating a community search macro, the method comprising:

provided a search macro for an access by a set of users, wherein a macro is a set of instructions or scripts that are executed automatically, and wherein the search macro automatically executes a set of search engine rules, wherein the search engine rules are embedded within the search macro, and wherein the search engine rules include a plurality of modifiers, the plurality of modifiers defining characteristics required by of a set of websites explored by the search engine upon execution of the search macro;

providing for an execution of the search macro by a member of the set of users to receive a set of search results;

receiving an indication of the execution of the search macro, wherein the indication of the execution of the search macro includes a set of search results;

allowing an access of the search macro by the set of users to edit the search macro wherein each edit modifies the search macro;

receiving inputs from the set of users to edit the search macro; and allowing the set of users access to the modified search macro after the edit and wherein executing the modified search macro alters the set of search results.

2. The media of claim 1, further comprising creating the search macro to reside on one or more computing devices.

3. The media of claim 2, further comprising providing for the access to a prior version of the modified search macro to the set of users.

4. The media of claim 3, wherein the search macro is selected from a group including a set of search macros.

5. The media of claim 2, further comprising restricting the access to edit the search macro to a subset of the set of users.

6. The media of claim 5, wherein the subset is selected from a group including a set of subscribers to a service.

7. The media of claim 6, wherein the search macro includes a customized set of search engine rules.

8. The media of claim 4, wherein providing for the execution of the search macro comprises providing for the execution of a web search, an image search, a video search, a news search, a book search, a blog search, or an academic search.

9. A computer system having a processor and a memory, the computer system operable to execute a method for creating a community search macro, comprising:
    providing a search macro for an access by a set of users, wherein a macro is a set of instructions or scripts that are executed automatically, and wherein the search macro automatically executes a set of search engine rules, wherein the search engine rules are embedded within the search macro, and wherein the search engine rules include a plurality of modifiers, the plurality of modifiers defining characteristics required by a set of websites explored by the search engine upon execution of the search macro;
    providing for an execution of the search macro by a member of the set of users to receive a set of search results;
    receiving an indication of the execution of the search macro, wherein the indication of the execution of the search macro includes a set of search results;
    allowing an access of the search macro by the set of users to edit the search macro wherein each edit modifies the search macro;
    receiving inputs from the set of users to edit the search macro; and
    allowing the set of users access to the modified search macro after the edit wherein executing the modified search macro alters the set of search results.

10. The system of claim 9, further comprising creating the search macro to reside on one or more computing devices.

11. The system of claim 10, further comprising providing for the access to a prior version of the modified search macro to the set of users.

12. The system of claim 10, further comprising restricting the access to edit the search macro to a subset of the set of users.

13. The system of claim 12, wherein the subset is selected from a group including a set of subscribers to a service.

14. The system of claim 11, wherein providing for the execution of the search macro comprises providing for the execution of a web search, an image search, a video search, a news search, a book search, a blog search, or an academic search.

15. A method of operating a community of search macros located in one or more computing devices, comprising:
    accessing a search macro by one or more users, wherein a macro is a set of instructions or scripts that are executed automatically, and wherein the search macro automatically executes a set of search engine rules, wherein the search engine rules are embedded within the search macro, and wherein the search engine rules include a plurality of modifiers, the plurality of modifiers defining characteristics required by a set of websites explored by the search engine upon execution of the search macro;
    executing the search macro by the one or more users;
    generating an indication of the execution of the search macro, wherein the indication of the execution of the search macro includes a set of search results;
    obtaining inputs form the set of users to edit the search macro;
    editing the search macro by a member of the one or more users to modify a content in the search macro wherein the one or more users access the modified search macro and wherein executing the modified search macro alters the set of search results.

16. The method of claim 15, further comprising accessing a prior version of the modified search macro by the one or more users.

17. The method of claim 15, further comprising restricting an access to edit the search macro to a subset of the one or more users.

18. The method of claim 17, wherein the subset is selected from a group including a set of subscribers to a service.

19. The method of claim 16, wherein executing the search macro comprises executing a web search, an image search, a video search, a news search, a book search, a blog search, or an academic search.

20. The method of claim 16, wherein the member is not an owner, an author, or a creator of the search macro.

* * * * *